United States Patent
Liu et al.

(10) Patent No.: US 7,547,870 B2
(45) Date of Patent: Jun. 16, 2009

(54) PRECISION SPACECRAFT PAYLOAD PLATFORMS

(75) Inventors: Ketao Liu, Cerritos, CA (US); Gregory S. Becker, Redondo Beach, CA (US); Peter J. Sedivec, Manhattan Beach, CA (US); Douglas Bender, Redondo Beach, CA (US)

(73) Assignee: The Boeing Company, Chicago, IL (US)

( * ) Notice: Subject to any disclaimer, the term of this patent is extended or adjusted under 35 U.S.C. 154(b) by 137 days.

(21) Appl. No.: 11/400,874

(22) Filed: Apr. 10, 2006

(65) Prior Publication Data

US 2007/0210266 A1 Sep. 13, 2007

Related U.S. Application Data

(60) Provisional application No. 60/780,891, filed on Mar. 9, 2006.

(51) Int. Cl.
*G01C 21/02* (2006.01)
*G01N 21/86* (2006.01)
*G01B 11/26* (2006.01)
*B64G 1/36* (2006.01)

(52) U.S. Cl. ............................. 250/206.2; 250/559.29; 356/139.03; 244/171

(58) Field of Classification Search .............. 250/208.2, 250/206.1, 206.2, 203.1–203.3, 559.29; 342/358, 359, 360; 356/139.01–139.03, 356/139.04; 244/164, 171, 172.5, 173.1
See application file for complete search history.

(56) References Cited

U.S. PATENT DOCUMENTS

| | | | |
|---|---|---|---|
| 4,591,996 A | 5/1986 | Vachon | |
| 4,926,050 A | 5/1990 | Shemwell | |
| 5,000,564 A | * 3/1991 | Ake | 356/3.16 |
| 5,046,851 A | 9/1991 | Morgan | |

(Continued)

FOREIGN PATENT DOCUMENTS

EP 1524497 4/2005

OTHER PUBLICATIONS

Bergh, "A Compact, Low Power Two-Axis Scanning Laser Rangefinder For Mobile Robots," Jet Propulsion Lab, Pasadena, CA, pp. 1-6.

(Continued)

*Primary Examiner*—Georgia Y Epps
*Assistant Examiner*—Don Williams
(74) *Attorney, Agent, or Firm*—Canady & Lortz LLP; Bradley K. Lortz

(57) ABSTRACT

One or more fixed-orientation fanned laser beams and one or more displacement measurement devices to precisely measure the orientation of a payload platform are disclosed in a metrology system and method. The measurement devices may be distributed at locations across a payload platform such that displacement changes of these devices can be used to accurately determine platform pointing. Laser beam transmitters may be fixed in the same reference block to which a spacecraft attitude sensor is mounted. Fanned laser beams are transmitted from these sources to the measurement devices so that their displacements can be determined with respect to the plane of the fanned beams and thereby with respect to the spacecraft attitude sensor. Only a small number of fixed laser beams are needed to achieve precision measurements at a reduced cost, weight and power, and with increased system reliability and simplified system integration.

22 Claims, 7 Drawing Sheets

U.S. PATENT DOCUMENTS

| | | | |
|---|---|---|---|
| 5,243,398 | A | 9/1993 | Nielson |
| 5,517,861 | A | 5/1996 | Haas et al. |
| 5,742,394 | A | 4/1998 | Hansen |
| 5,812,267 | A | 9/1998 | Everett et al. |
| 6,081,614 | A | 6/2000 | Yamada et al. |
| 6,293,027 | B1 * | 9/2001 | Elliott et al. ............... 33/546 |
| 6,504,610 | B1 * | 1/2003 | Bauer et al. ............... 356/399 |
| 6,545,751 | B2 | 4/2003 | Beliveau et al. |
| 6,646,723 | B1 | 11/2003 | Dubovitsky et al. |
| 6,778,284 | B2 | 8/2004 | Casagrande |
| 7,110,092 | B2 | 9/2006 | Kasper et al. |
| 7,242,483 | B2 | 7/2007 | Liu et al. |
| 2004/0032596 | A1 | 2/2004 | Lange et al. |
| 2004/0104308 | A1 * | 6/2004 | Leung ..................... 244/171 |
| 2004/0144910 | A1 * | 7/2004 | Peck et al. ............. 250/206.2 |
| 2004/0174542 | A1 * | 9/2004 | Handman et al. ......... 356/622 |
| 2005/0082262 | A1 | 4/2005 | Rueb et al. |
| 2005/0235504 | A1 | 10/2005 | Barvosa-Carter et al. |
| 2005/0248491 | A1 * | 11/2005 | Leyre et al. ............... 343/702 |
| 2006/0044549 | A1 | 3/2006 | Liu et al. |
| 2006/0187470 | A1 | 8/2006 | Massey et al. |
| 2007/0103698 | A1 | 5/2007 | Liu et al. |

OTHER PUBLICATIONS

Strickon, "Design and HCI Applications of a Low-Cost Scanning Laser Rangefinder," Massachusetts Institute of Technology, Jun. 1999, pp. 1-140.

Tsumura et al., "A Method of Position and Attitude Measurement of Vehicle Using Fan Shaped Laser Beam and Corner Cube," IEEE issue 12-15, Oct. 1993, pp. 517-520.

PCT/US2007/005771 International Search Report and Written Opinion, Jun. 19, 2008.

* cited by examiner

PRECISION SPACECRAFT PAYLOAD PLATFORMS

CROSS-REFERENCE TO RELATED APPLICATIONS

This application claims the benefit under 35 U.S.C. §119 (e) of the following co-pending U.S. Provisional Patent Application, which is incorporated by reference herein:

U.S. Provisional Application Ser. No. 60/780,891, filed Mar. 9, 2006, by Liu et al., entitled "PRECISION SPACECRAFT PAYLOAD PLATFORMS".

This application is related to the following and commonly-assigned U.S. utility patent applications, which are both incorporated by reference herein:

U.S. patent application Ser. No. 10/917,924, filed Aug. 12, 2004, by Liu et al., entitled "SMART SPACECRAFT STRUCTURES BASED ON LASER METROLOGY"; and U.S. patent application Ser. No. 11/270,000, filed Nov. 9, 2005, by Liu et al., entitled "FANNED LASER BEAM METROLOGY SYSTEM".

BACKGROUND OF THE INVENTION

1. Field of the Invention

This invention relates to platform pointing as used in space applications. Particularly, this invention relates to precision pointing measurement for spacecraft platforms in optical and communication payloads.

2. Description of the Related Art

Pointing accuracy is a fundamental problem for any spacecraft design. Virtually every mission requires an ability to accurately point a payload of some type at a distant location. For example, communication satellites require very precise pointing of receive and/or transmit antennas to locations on the ground or to other spacecraft. Similarly, optical payloads for observation satellites require extremely accurate pointing to locations on the Earth. Because of the distances involved in space missions, improving pointing precision is always a desirable objective. An extremely small angular pointing error can result being off target by tens of kilometers. For example, a 0.1 degree angular error will result in pointing off target by more than approximately 60 kilometers. In addition, because a spacecraft structure cannot be made perfectly rigid, payload pointing will be significantly affected by structural vibration and structural deformation on-orbit.

Precise pointing of spacecraft payloads is made more difficult by many factors that can affect the structure of an operating spacecraft, e.g. a satellite placed on orbit. The goal is to achieve a required level precision in pointing a payload from a space based platform. With deployable communication payloads, for example, it may be necessary to measure platform alignment, launch shift and thermal distortion very accurately so that pointing can be adjusted to compensate. In addition to these problems, for optical payloads, high frequency measurements are also sometimes needed for the purpose of compensating payload line of sight (LOS) jitter. In such applications, payload pointing systems and methods are typically required to have relatively high bandwidth in addition to high precision. Simplicity, light weight and easily implemented packaging are also desirable characteristics for any pointing systems. Existing pointing systems can generally be classified into two broad categories, ground based systems and on-board systems.

Ground based systems include a use of ground-based RF and/or optical beacons or landmarks from which optical payloads can register a precisely known location. Pointing accuracy is provided as a relative angular position off the known location of the beacon or landmark. However, beacons are often undesirable for spacecraft because their use entails higher operating costs. The ground beacon must be separately and continuously maintained. In addition, beacons are vulnerable to adversary attacks during a conflict, a particular consideration for any military applications. On the other hand, landmark based solutions introduce significant operational complexities. Fore example, landmarks must be carefully selected, sophisticated imaging processing is required to determine landmarks from images taken by spacecraft payloads, and constant spacecraft and ground spacecraft system link must be maintained.

Although the notion has existed for a time, on-board payload pointing measurement is only an emerging field and no working on-board pointing system has been launched to date. Some developing on-board pointing system technologies include camera based metrology systems, e.g. as developed by the Jet Propulsion Laboratory (JPL) and interferometer based metrology systems, e.g. as developed by JPL, for precision differential path measurements. In addition, Boeing has developed two laser metrology systems for application to large payload structures.

Camera based metrology systems for payload pointing, such as the systems developed by JPL, are relatively expensive and complex. In addition, due to their size and weight, integrating such systems into a spacecraft design is difficult. Furthermore, such systems typically have very low bandwidth, e.g. a highest measurement frequency below 10 Hz. Recently, JPL is also developing an interferometer based laser metrology system for differential path length measurements. However, the system cannot be applied to many pointing problems because spacecraft payload pointing measurement in general is not a path length measurement.

Previous systems have been developed using scanning fan beam laser metrology that have been developed for space based radar applications employing very large radar array structures. Although these systems are ideal for large radar array structures, they are very expensive and far more too complex for general payload pointing applications.

In view of the foregoing, there is a need in the art for systems and methods for providing very precise pointing of space-based platforms in general. Further, there is a need in the art for such systems and methods to provide precision measurements of distortions occurring across spacecraft structures and smaller payload structures. In addition, there is a need for such systems and methods to be less expensive and more precise with high bandwidth measurement. There is also a need for such systems and methods to be simple, light weight and can be easily integrated into a spacecraft design. As detailed hereafter, these and other needs are met by the present invention.

SUMMARY OF THE INVENTION

One or more fixed-orientation fanned laser beams and one or more displacement measurement devices to precisely measure the orientation of a payload platform are disclosed in a metrology system and method. The measurement devices may be distributed at locations across a payload platform such that displacement changes of these devices can be used to accurately determine platform pointing. Laser beam transmitters may be fixed in the same reference block to which a spacecraft attitude sensor is mounted. Fanned laser beams are transmitted from these sources to the measurement devices so that, by measuring beam positions on these devices, their displacements can be determined with respect to the plane of the fanned beams and thereby with respect to the spacecraft attitude sensor. Only a small number of fixed laser beams are needed to achieve precision measurements at a reduced cost, weight and power, and with increased system reliability and simplified system integration.

A typical embodiment of the invention comprises a first fanned laser light source for emitting a first fanned laser light beam towards a structure and one or more first laser light sensing devices affixed to the structure and disposed to intersect the first fanned laser light beam for measuring a position of the first fanned laser light beam on each of these devices to determine an orientation of the structure with respect to the first fanned laser beam. The first fanned laser light beam has a substantially fixed orientation relative to a spacecraft attitude sensor. Typically, the one or more first laser light sensing devices may each comprise a position sensing device (PSD) and three or more laser light sensing devices are employed. Further, the one or more first laser light sensing devices may be disposed proximate to one or more mounting points of a pointed payload.

In one exemplary embodiment, the structure may comprise a spacecraft payload structure supporting a pointed payload and the determined orientation of the structure is applied to reduce any pointing error of the pointed payload. The reduced pointing error may include jitter that may be caused by structural thermal deformation and structural vibration.

In further embodiments, a second fanned laser light source is used for emitting a second fanned laser light beam towards the structure that is not coplanar with the first fanned laser light beam and one or more second laser light position sensing devices affixed to the structure and disposed to intersect the second fanned laser light beam for measuring a position of the second fanned laser light beam on each of the one or more second laser light sensing devices to determine the orientation of the structure with respect to the second fanned beam. Here also, the second fanned laser light source may have a second substantially fixed orientation relative to the attitude sensor. Typically, the first fanned laser light beam and the second fanned laser light beam may be substantially orthogonal. The position of the first fanned laser light beam may be used to determine bending of the structure about a first axis. The position of the second fanned laser light beam may be used to determine bending of the structure about a second axis. The combined positions of the first and second fanned laser light beams can be used to determine torsion of the structure. The position of the first fanned laser light beam and the position of the second fanned laser light beam may be combined to determine the orientation of the structure in all three axes.

Similarly, a typical method embodiment of the invention includes emitting a first fanned laser light beam from a first fanned laser light source towards a structure and measuring a position of the first fanned laser light beam with each of one or more first laser light sensing devices affixed to the structure and disposed to intersect the first fanned laser light beam to determine an orientation of the structure. The first fanned laser light source has a substantially fixed orientation relative to a spacecraft attitude sensor. In one exemplary embodiment, the method may further incorporate measuring a second fanned laser light beam. Measurements of the first and second beam can be applied individually to determine bending about different axes and in combination to determine torsion about a longitudinal axis of the structure. The method may be further modified consistent with the apparatus embodiments described herein.

BRIEF DESCRIPTION OF THE DRAWINGS

Referring now to the drawings in which like reference numbers represent corresponding parts throughout.

DETAILED DESCRIPTION OF THE PREFERRED EMBODIMENT

1. Overview

Embodiments of this invention meet the objective of providing a precision pointing measurement system and method for spacecraft payload platforms. Spacecraft optical payloads requiring precision pointing can utilize the invention. In addition, many deployable communication payloads can also obtain accurate pointing to meet required link margins employing embodiments of the invention. Such precision measurement is of critical importance to point the payload of a space based platform very accurately.

Further, embodiments of the present invention have advantages over other laser based metrology systems for pointing payloads on spacecraft in terms of simplicity, low cost, light weight and easy integration.

Figure 1A:
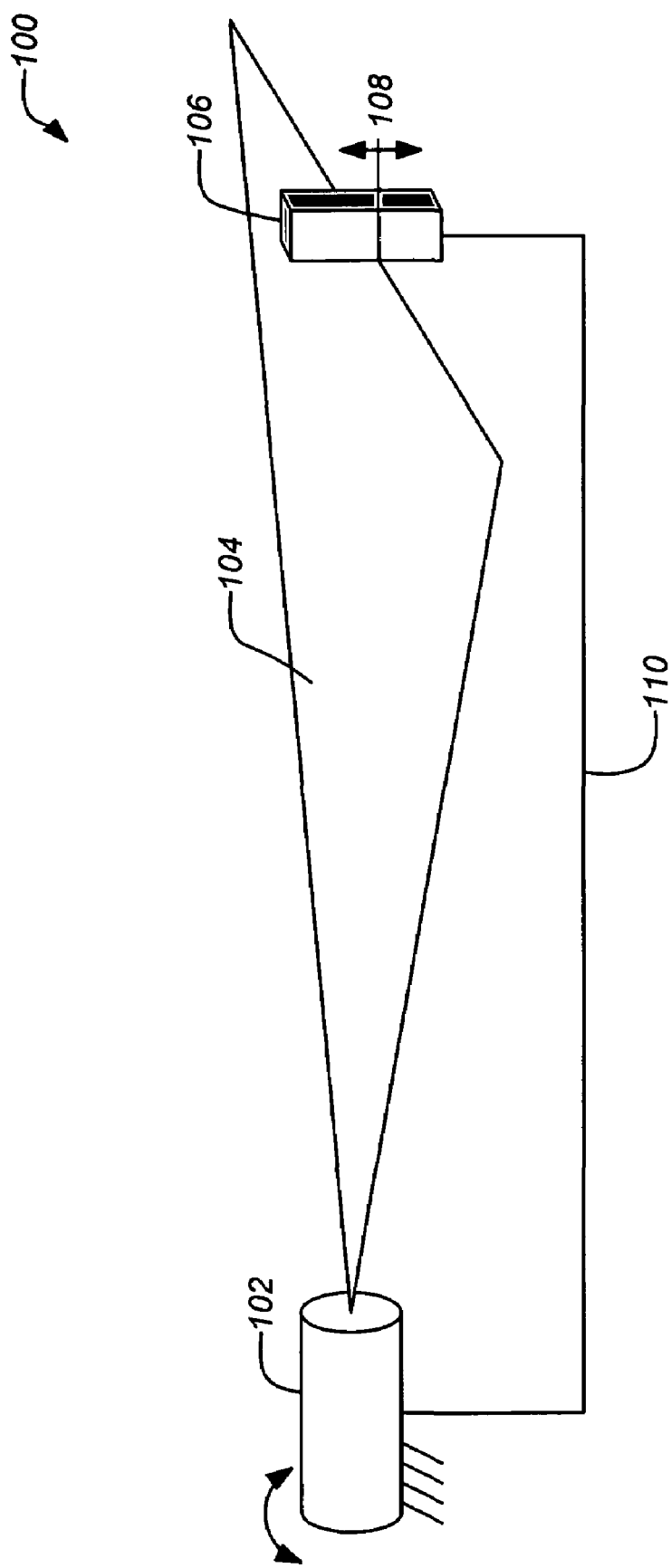
FIG. 1A is a schematic illustration of a basic measurement unit for a typical embodiment of the invention.

FIG. 1A is a schematic illustration of a foundational measurement unit 100 for a typical embodiment of the invention. It includes a laser beam transmitter 102 which transmits a fanned laser beam 104 at a fixed orientation (relative to a structure 110 of interest), and a position sensing device (PSD) 106 affixed to the supporting structure 110 that intersects the fanned laser beam. The supporting structure 110 is shown schematically as merely a line connecting the laser transmitter 102 and the PSD 106 as any structural form may be used with an embodiment of the invention. The PSD 106 is a known one dimensional measuring device that measures an illumination position of the beam on the PSD 106 in the measuring direction 108 substantially perpendicular to the fanned laser beam 104.

In use the laser beam transmitter 102 is oriented and fixed such that the plane of the fanned laser beam 104 intersects the PSD 106 substantially perpendicular to the measurement direction 108. By measuring the position of the fanned laser beam 104 on the PSD 106, one can determine the vertical position (i.e. along the measurement direction 108) of this PSD 106 with respect to the plane of the fanned laser beam 104. By determining the position of the fanned laser beam 104 and comparing the current determined position to a prior determined position, any distortion occurring in the supporting structure 110 can be derived. In applications where the structure 110 is used to support a pointed payload, any pointing error as a result of the distortion can be reduced by compensating for the defined distortion of the structure 110.

It should be noted that although the measuring device 106 is referenced as a PSD throughout the description, embodiments of the invention can also employ other types of laser light position sensing devices for making a linear position measurement, such as a one dimensional CCD device, to form the measurement unit 100. However, a PSD is particularly desirable because it has a much wider measurement bandwidth capable of providing accurate measurements up to 10 KHz. This makes them useful in compensating for payload line of sight (LOS) jitter previously described. Another significant advantage of employing a PSD is that it is not complex. Both the PSD device and its electronics are very simple, and can be readily developed into a single compact unit to be embedded into a payload platform structure on a spacecraft. In addition, a PSD is also very accurate. The device has a typical accuracy ratio of 1:1000 with respect to its size (e.g. 10 μ-meter over a 10 millimeter length PSD). A ratio of 1:10,000,000 is also reported in literature.

Figure 1B:
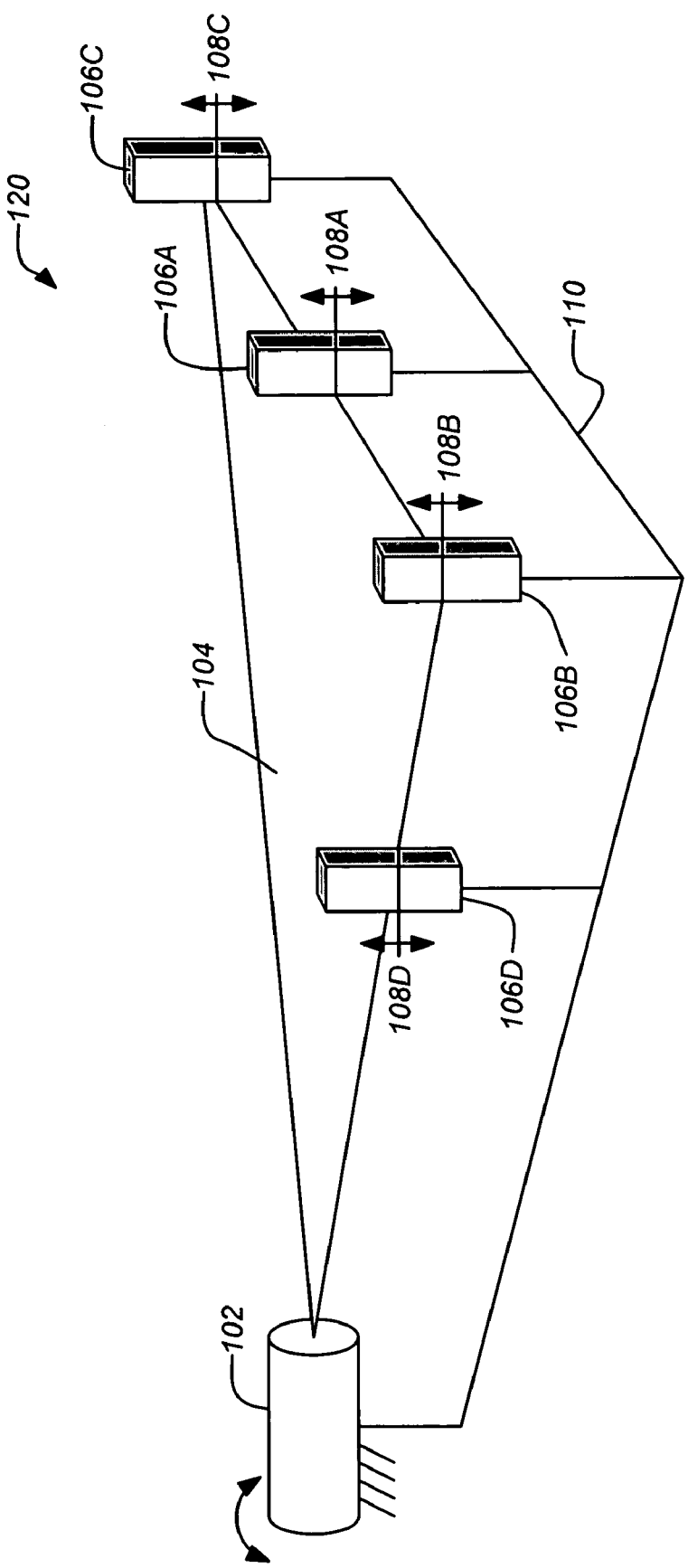
FIG. 1B is a schematic illustration of a set of measurement units as used in a typical embodiment of the invention.

FIG. 1B is a schematic illustration of a set of measurement units as used in a typical embodiment of the invention. The system 120 employs the all the elements of the foundational measurement unit 100 of FIG. 1A. However in this case, a plurality of PSDs 106A-106D are now affixed to the structure 110 at different locations. The plurality of PSDs 106A-106D now provide a plurality of measurements regarding the position of the fanned laser beam 104. As will be understood by those skilled in the art, different numbers of PSDs applied to a common fixed laser transmitter 102 depending upon the measurement requirements for any distortion of the structure 110 in order to compensate for pointing error resulting therefrom. For example, two PSDs can determine the distortion of a line and three PSDs can determine the distortion of a plane. In addition, other PSDs may be added to reduce the computational burden, e.g. using four PSDs to determine the distortion of a plane.

2. Exemplary Precision Platform Pointing System

Figure 2:
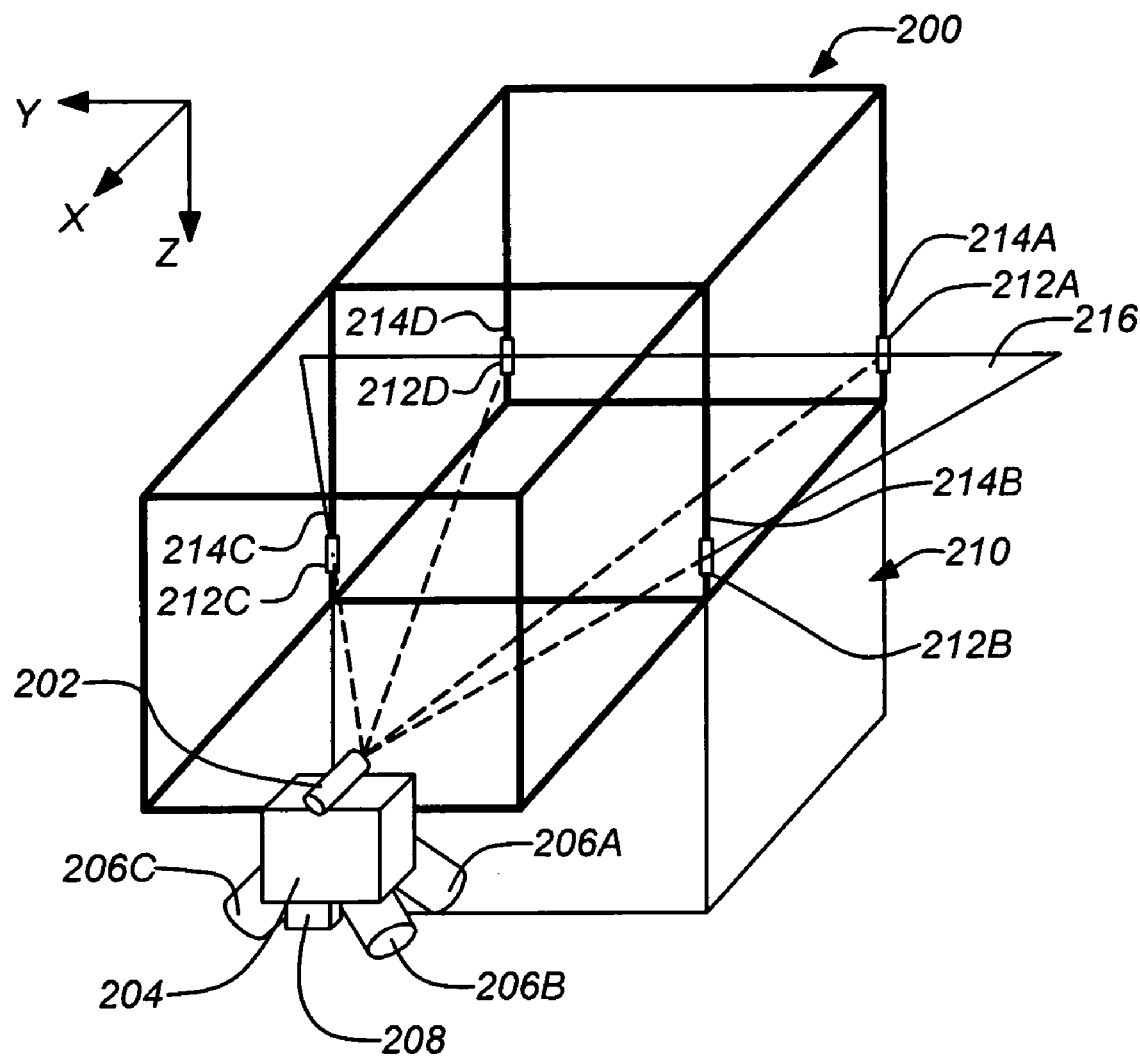
FIG. 2 is a schematic illustration of an exemplary embodiment of the invention implemented in a precision truss platform for a spacecraft.

FIG. 2 is a schematic illustration of an exemplary embodiment of the invention implemented in a precision truss platform for a spacecraft. The structure 200 of a truss platform may be employed for payloads of an Earth observation satellite. The laser transmitter 202 may be conveniently mounted on a reference frame block 204 and co-located with star trackers 206A-206C and/or gyros 208 that provide an accurate pointing reference for the Earth observation payload 210 (represented by the cube below the structure 200) to the structure 200. Four embedded PSDs 212A-212D are mounted on the truss members 214A-214D that connect directly to the mounting positions of the payload 210. A transmitted fanned laser beam 216 intersects these four PSDs 212A-212D. The four PSDs 212A-212D measure the position of the fanned laser beam 216 which determines an orientation of the supporting structure 200. Because the four PSDs 212A-212D connect directly to the mounting positions of the payload 210, the measurements from PSDs 212A-212D provide precision measurements of payload orientation per the following equations (1) and (2).

$$\theta_x = k_x \frac{(PSD_{+x,+y} - PSD_{+x,-y}) + (PSD_{-x,+y} - PSD_{-x,-y})}{2} \quad (1)$$

$$\theta_y = k_y \frac{(PSD_{+x,+y} - PSD_{-x,+y}) + (PSD_{+x,-y} - PSD_{-x,-y})}{2} \quad (2)$$

where PSD+x,+y, PSD+x,-y, PSD-x,+y and PSD-x,-y are measurements from the front-left, front-right, back-left and back-right, respectively. The known orientation of the structure 210 (corresponding to the orientation of the payload) can now be applied to reduce any pointing error of the payload. For example, the known orientation, which may be exhibit temporary distortions from thermal or other environmental variables, can be applied to positioner and/or spacecraft control of the payload platform. In addition, other types of pointing error, such as jitter, can be reduced by steering mirrors of the payload with the determined orientation of the structure 210.

As previously mentioned, because of high bandwidth characteristics of PSDs, this measurement system is capable of measuring payload LOS or mounting jitter caused by any high frequency vibration of the truss platform. Thus, embodiments of the invention enable an effective jitter compensation by using payload steering mirrors.

An important consideration in developing an optimum design for a specific application employing an embodiment of the invention is placement of the PSDs as well as the laser transmitter. As illustrated in the previous embodiment, locating the PSDs at structural mounting points to minimize the local distortion occurring between the PSDs and the payload will yield more precise information regarding payload orientation. In addition, it is convenient to locate the laser transmitter on the same reference frame block to which spacecraft attitude sensors are mounted. The attitude sensors, such as star trackers, provide accurate sensing of reference block attitude, while the PSDs measure the orientation of payload pointing with respect to the reference block. Structural deformation and vibration measurements are typically captured normal to the fanned laser beam. The laser transmitter and PSDs will be typically disposed with the fanned laser beam normal to the direction of the greatest expected structural distortions in so far as these distortions impact pointing error.

Figure 3:
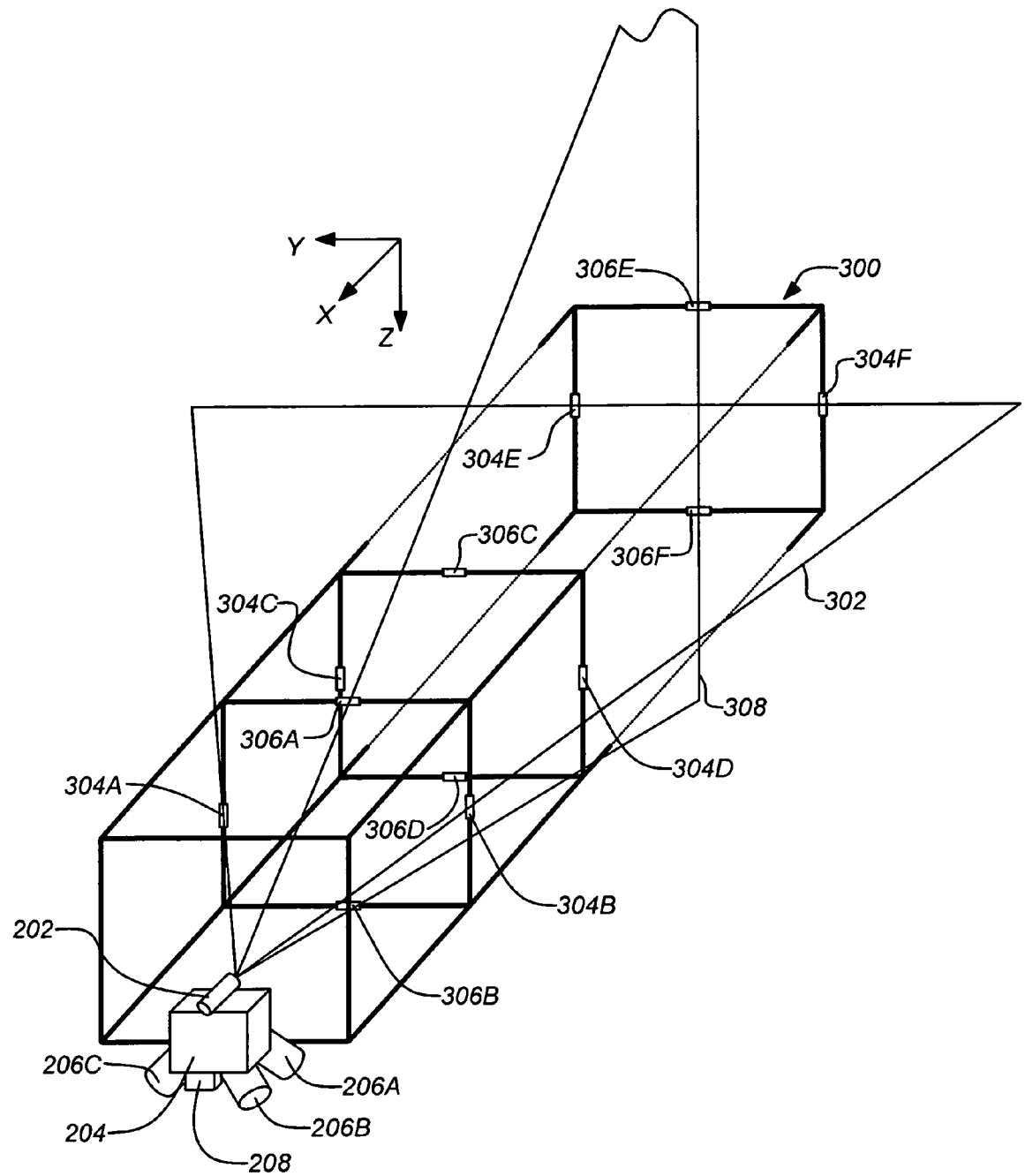
FIG. 3 is a schematic illustration of another exemplary embodiment of the invention implemented using two fan beams to measure bending and torsion of a truss platform.

FIG. 3 is a schematic illustration of another exemplary embodiment of the invention implemented using two fan beams to measure bending and torsion of a truss platform. The system provides a more general design that can measure pointing errors induced by two dimensional bending and one-dimensional torsion of a long truss structure 300. The system includes two substantially orthogonal fanned laser beams, a horizontal fanned laser beam 302 and a vertical fanned laser beam 308. These beams can be transmitted by either one laser transmitter or two laser transmitters. Each of the fanned laser beams 302, 308 intersect a different set of two sets of embedded PSDs, a horizontal set 304A-304F and a vertical set 306A-306F. The vertical beam 308 and vertical PSD set 306A-306F may be used to measure pointing errors primarily induced by Z-directional bending as shown by equation (3). The horizontal beam 302 and horizontal PSD set 304A-304F are used to measure pointing errors primarily induced by Y-directional bending as shown by equation (4). Measurements from two sets of beams 302, 308 and PSDs 304A-304F, 306A-306F may be combined to determine pointing errors primarily induced by X-directional torsion as shown by equation (5).

$$bending_Z = \frac{PSD_{+z} + PSD_{-z}}{2} \quad (3)$$

$$bending_y = \frac{PSD_{+y} + PSD_{-y}}{2} \quad (4)$$

$$torsion_x = \frac{(PSD_{+y} - PSD_{-y}) + (PSD_{+z} - PSD_{-z})}{2} \quad (5)$$

where PSD+z, PSD−z, PSD+y and PSD−y are measurements from the lower, upper, left and right PSD sensors, respectively.

Figure 4:
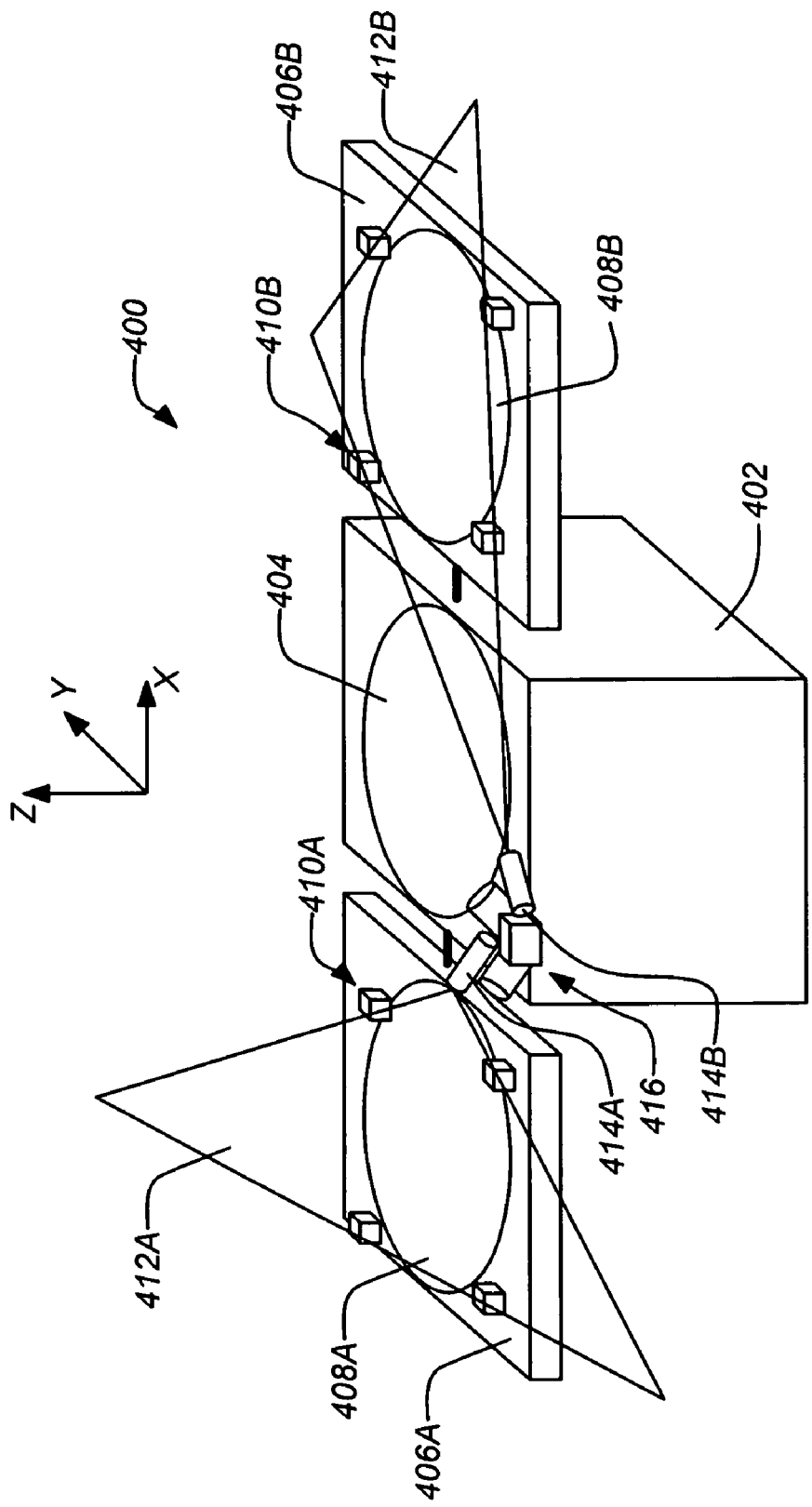
FIG. 4 is a schematic illustration of another exemplary embodiment of the invention implemented with precision deployable phase array platforms.

FIG. 4 is a schematic illustration of yet another exemplary embodiment of the invention implemented with precision deployable phase array platforms. Here an embodiment of the invention is applied to two deployable RF payloads on a body stabilized spacecraft 400. The spacecraft 400 comprises a bus 402 which supports a transmit phase array antenna 404. Two deployable platforms 406A, 406B each support a receive phase array antenna 408A, 408B. In this case, because the deployable platforms 406A, 406B are subject to a greater distortion than the bus 402, they require a precision measurement system to improve pointing performance of their respective arrays 408A, 408B.

Two sets 410A, 410B of four PSDs each are integrated into each of the +X and −X deployable phase array antenna 408A, 408B. The PSD sets 410A, 410B are optimally disposed around a periphery of each of the phase array antenna 408A, 408B proximate to mounting points of each antenna 408A, 408B to its respective platform 406A, 406B. In this way, the measurements from each PSD set 410A, 410B provide positions of four widely separate points of each antenna 408A, 408B. These sensors provide needed measurements for determining orientations of the antenna 408A, 408B with respect to the bus 402.

Two fanned laser beams 412A, 412B are transmitted from laser transmitters 414A, 414B, respectively, to the PSD sets 410A, 410B to measure the orientations of each phase array antennas 408A, 408B with respect to star tracker reference block 416. Any phase array antenna 408A, 408B distortion measured by these PSD sets 410A, 410B (captured in a measurement of the antenna orientation) will be applied to steer the RF beams to more precisely point phase array LOS. In addition to deployable phase arrays, embodiments of the invention can be directly applied to accurately point state of the art flexible phase array antenna.

Figure 5:
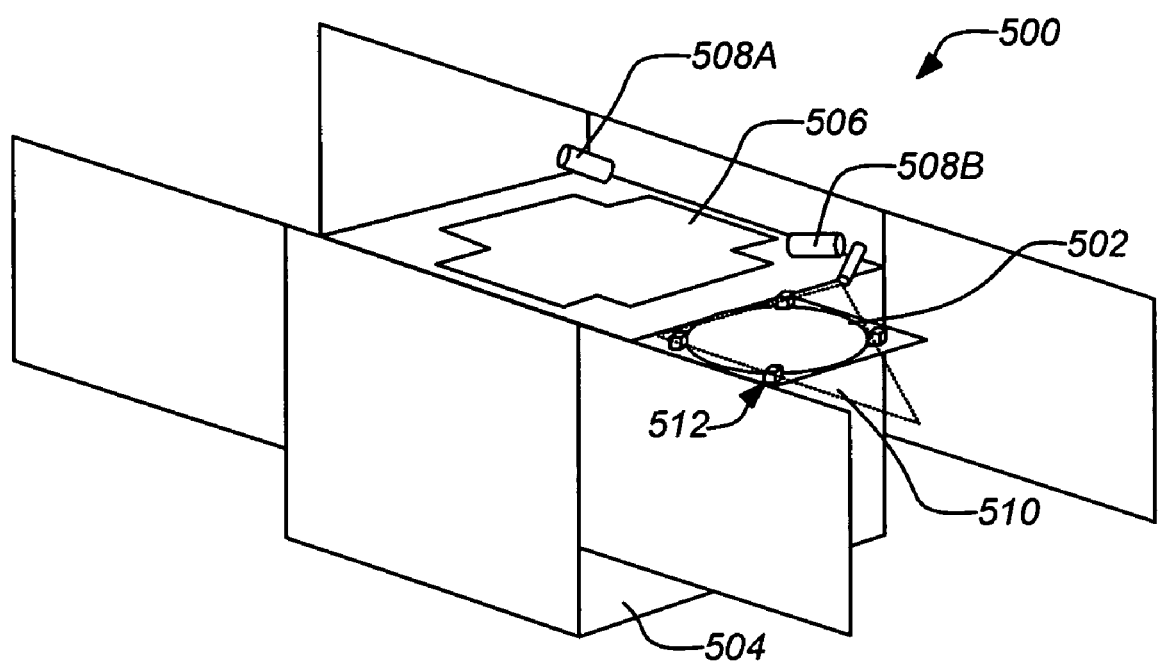
FIG. 5 illustrates an exemplary spacecraft with a deployed receiving phase array from one side of the spacecraft bus.

FIG. 5 shows another spacecraft 500 configuration with a deployed receiving phase array antenna 502 from one side of the spacecraft bus 504. Similar to the spacecraft 400 of FIG. 4, the pointing accuracy of this phase array antenna 502 will be significantly lower than that of the transmitting phase array 506 mounted on the deck of the bus 504 and co-located with star trackers 508A, 508B (at a reference frame block). To achieve high pointing accuracy of the deployed array 502, a similar fanned laser beam 510 from a laser transmitter 514 fixed proximate to the reference block and four PSD set 512 measurement system as applied in FIG. 4 can be used here to reduce the pointing error of the deployed array 502 by adjusting the phase array beam steering based on the measured orientation of the deployed array 502.

3. Precision Platform Pointing Method

Figure 6:
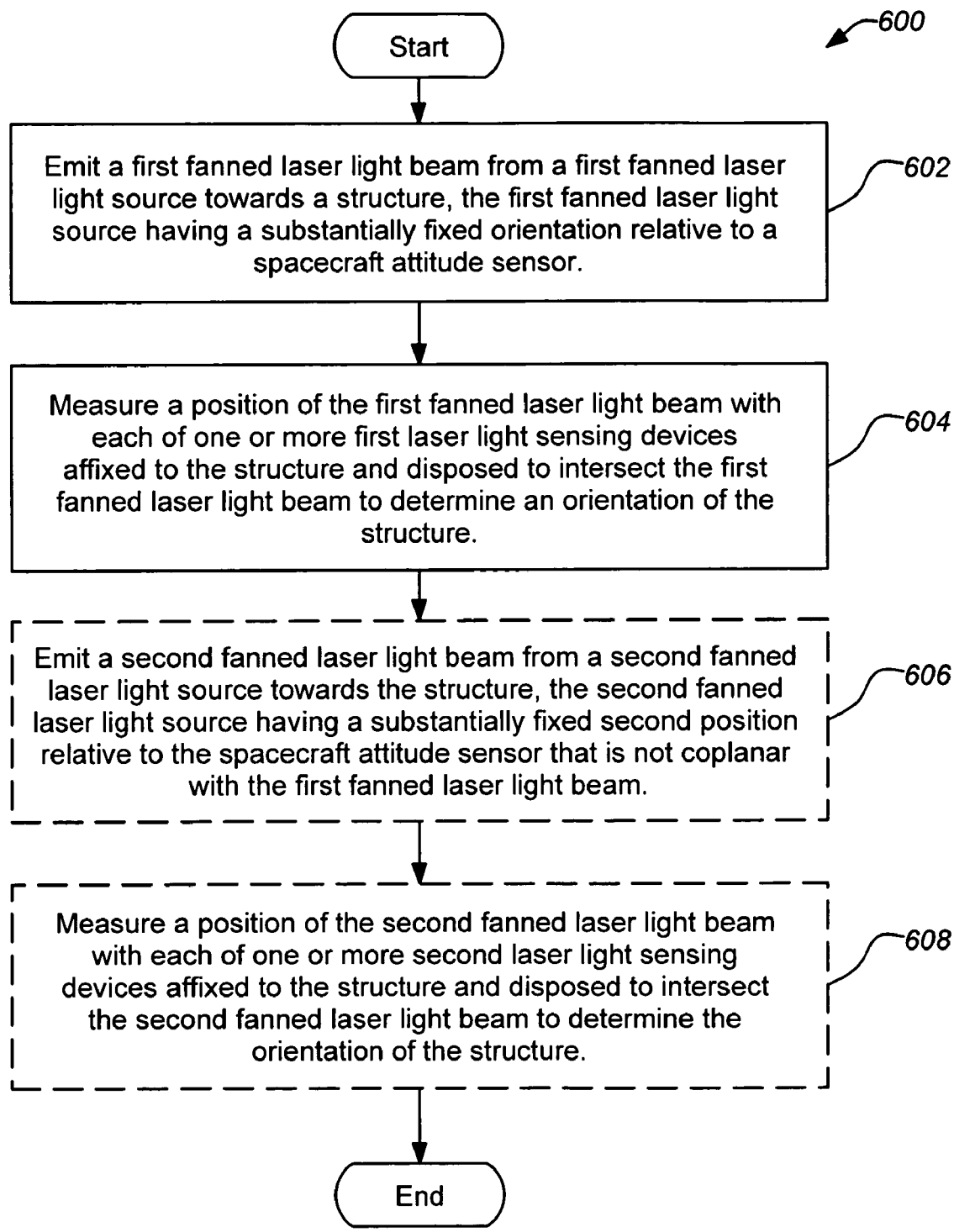
FIG. 6 is a flowchart of an exemplary method of the invention.

FIG. 6 is a flowchart of an exemplary method 600 of the invention. The method 600 begins with the operation 602 of emitting a first fanned laser light beam from a first fanned laser light source towards a structure. The first fanned laser light source has a substantially fixed orientation relative to the reference block of one or more spacecraft attitude sensors. Next in operation 604, a position of the first fanned laser light beam is measured with each of one or more laser light position sensing devices affixed to the structure and disposed to intersect the first fanned laser light beam to determine an orientation of the structure. The method 600 may be further modified consistent with the apparatus embodiments described herein. Notably, the method 600 may incorporate operations relating to measuring a second fanned laser light beam as follows.

In optional operation 606, a second fanned laser light beam is emitted from a second fanned laser light source towards the structure. The second fanned laser light source has a second substantially fixed position relative to the structure that is not coplanar with the first fanned laser beam. Following this, in optional operation 608, a position of the second fanned laser light beam is measured with each of one or more second laser light position sensing devices affixed to the structure and disposed to intersect the second fanned laser light beam to determine the orientation of the structure. The measurements from the first and second beams can be applied individually to determine bending about different axes and in combination to determine torsion about a longitudinal axis as previously described respecting the structure of FIG. 3.

This concludes the description including the preferred embodiments of the present invention. The foregoing description including the preferred embodiment of the invention has been presented for the purposes of illustration and description. It is not intended to be exhaustive or to limit the invention to the precise forms disclosed. Many modifications and variations are possible within the scope of the foregoing teachings. Additional variations of the present invention may be devised without departing from the inventive concept as set forth in the following claims.

What is claimed is:

1. An apparatus, comprising:
   a first fanned laser light source for emitting a first fanned laser light beam towards a structure, the first fanned laser light source having a first substantially fixed orientation relative to a spacecraft attitude sensor; and
   a plurality of first laser light sensing devices affixed to the structure distributed at different locations across the structure and disposed to intersect the first fanned laser light beam for measuring a position of the first fanned laser light beam on each of the plurality of first laser light sensing devices to determine an orientation of the structure and derive distortion occurring in the structure;
   wherein the structure connects the first fanned laser light source to the plurality of first laser light sensing devices and the structure comprises a spacecraft payload structure supporting a pointed payload and the determined orientation of the structure and derived distortion occurring in the structure are applied to reduce any pointing error of the pointed payload.

2. The apparatus of claim 1, wherein the plurality of first laser light sensing devices each comprise a position sensing device (PSD).

3. The apparatus of claim 1, wherein the plurality of first laser light sensing devices comprise three or more laser light sensing devices.

4. The apparatus of claim 1, wherein the plurality of first laser light sensing devices are disposed proximate to a plurality of mounting points of a pointed payload.

5. The apparatus of claim 1, wherein the pointing error includes jitter reduced from applying the measured position of the first fanned laser light beam to a payload pointing compensation device.

6. The apparatus of claim 1, further comprising a second fanned laser light source for emitting a second fanned laser light beam towards the structure, the second fanned laser light source having a second substantially fixed orientation relative to spacecraft attitude sensors that is not coplanar with the first fanned laser light beam; and
one or more second laser light sensing devices affixed to the structure and disposed to intersect the second fanned laser light beam for measuring a position of the second fanned laser light beam with each of the one or more second laser light sensing devices to determine the orientation of the structure.

7. The apparatus of claim 6, wherein the position of the first fanned laser light beam and the position of the second fanned laser light beam are combined to determine the orientation of the structure in all three axes.

8. The apparatus of claim 6, wherein the first fanned laser light beam and the second fanned laser light beam are substantially orthogonal.

9. The apparatus of claim 6, wherein the position of the first fanned laser light beam determines bending of the structure about a first axis and the position of the second fanned laser light beam determines bending of the structure about a second axis and the position of the first fanned laser light beam and the position of the second fanned laser light beam combined determine torsion of the structure.

10. A method, comprising:
emitting a first fanned laser light beam from a first fanned laser light source towards a structure, the first fanned laser light source having a substantially fixed orientation relative to a spacecraft attitude sensor; and
measuring a position of the first fanned laser light beam with each of a plurality of first laser light sensing devices affixed to the structure distributed at different locations across the structure and disposed to intersect the first fanned laser light beam to determine an orientation of the structure and derive distortion occurring in the structure;
wherein the structure connects the first fanned laser light source to the plurality of first laser light sensing devices and the structure comprises a spacecraft payload structure supporting a pointed payload and the determined orientation of the structure and derived distortion occurring in the structure are applied to reduce any pointing error of the pointed payload.

11. The method of claim 10, wherein the plurality of first laser light sensing devices each comprise a position sensing device (PSD).

12. The method of claim 10, wherein the plurality of first laser light sensing devices comprises three or more laser light sensing devices.

13. The method of claim 10, wherein the plurality of first laser light sensing devices are disposed proximate to a plurality of mounting points of a pointed payload.

14. The method of claim 10, wherein the pointing error includes jitter reduced from applying the measured position of the first fanned laser light beam to a payload pointing compensation device.

15. The method of claim 10, further comprising emitting a second fanned laser light beam from a second fanned laser light source towards the structure, the second fanned laser light source having a second substantially fixed orientation relative to spacecraft attitude sensors that is not coplanar with the first fanned laser light beam; and
measuring a position of the second fanned laser light beam with each of one or more second laser light sensing linear measuring devices affixed to the structure and disposed to intersect the second fanned laser light beam to determine the orientation of the structure.

16. The method of claim 15, wherein the position of the first fanned laser light beam and the position of the second fanned laser light beam are combined to determine the orientation of the structure in all three axes.

17. The method of claim 15, where in the first fanned laser light beam and the second fanned laser light beam are substantially orthogonal.

18. The method of claim 15, wherein the position of the first fanned laser light beam determines bending of the structure about a first axis and the position of the second fanned laser light beam determines bending of the structure about a second axis and the position of the first fanned laser light beam and the position of the second fanned laser light beam combined determine torsion of the structure.

19. An apparatus, comprising:
a fanned laser light source means for emitting a fanned laser light beam towards a structure, the fanned laser light source means having a substantially fixed orientation relative to a spacecraft attitude sensor; and
a plurality of separate laser light sensing means affixed to the structure distributed at different locations across the structure and disposed to intersect the fanned laser light beam for measuring a position of the fanned laser light beam on each of the plurality of laser light sensing means to determine an orientation of the structure and derive distortion occurring in the structure;
wherein the structure connects the fanned laser light source means to the plurality of laser light sensing means and the structure comprises a spacecraft payload structure supporting a pointed payload and the determined orientation of the structure and derived distortion occurring in the structure are applied to reduce any pointing error of the pointed payload.

20. The apparatus of claim 19, wherein the plurality of laser light sensing means comprises three or more laser light sensing means.

21. The apparatus of claim 19, wherein the plurality of laser light sensing means are disposed proximate to one or more mounting points of a pointed payload.

22. The apparatus of claim 19, wherein the pointing error includes jitter reduced from applying the measured position of the fanned laser light beam.

* * * * *